United States Patent
Henderson

(10) Patent No.: US 6,683,938 B1
(45) Date of Patent: Jan. 27, 2004

(54) METHOD AND SYSTEM FOR TRANSMITTING BACKGROUND AUDIO DURING A TELEPHONE CALL

(75) Inventor: Donnie Henderson, Manalapan, NJ (US)

(73) Assignee: AT&T Corp., New York, NY (US)

( * ) Notice: Subject to any disclaimer, the term of this patent is extended or adjusted under 35 U.S.C. 154(b) by 82 days.

(21) Appl. No.: 09/942,423

(22) Filed: Aug. 30, 2001

(51) Int. Cl.⁷ .................................................. H04M 3/42
(52) U.S. Cl. .............. 379/67.1; 379/88.17; 379/101.01; 379/201.02; 455/414
(58) Field of Search ...................... 379/67.1, 68, 88.13, 379/88.16, 88.17, 88.19, 88.2, 88.21, 88.22, 88.23, 88.24, 101.01, 102.02, 201.01, 201.02, 114.03, 114.05, 114.13; 455/412, 413, 414, 415

(56) References Cited

U.S. PATENT DOCUMENTS

| | | | |
|---|---|---|---|
| 1,159,855 A | 11/1915 | Martin | |
| 4,429,187 A | 1/1984 | Butcher | |
| 4,577,067 A | 3/1986 | Levy et al. | |
| 4,578,789 A | 3/1986 | Middleton et al. | |
| 5,189,692 A | * 2/1993 | Ferrara | 379/88.28 |
| 5,838,683 A | 11/1998 | Corley et al. | |
| 6,125,175 A | 9/2000 | Goldberg et al. | |
| 6,407,325 B2 | * 6/2002 | Yi et al. | 84/610 |
| 6,459,774 B1 | * 10/2002 | Ball et al. | 379/67.1 |
| 2002/0082007 A1 | * 6/2002 | Hoisko et al. | 455/426 |
| 2002/0110224 A1 | * 8/2002 | Kovales et al. | 379/67.1 |
| 2002/0191757 A1 | * 12/2002 | Belrose | 379/88.13 |
| 2003/0013432 A1 | * 1/2003 | Fukaya | 455/412 |
| 2003/0028380 A1 | * 2/2003 | Freeland et al. | 704/260 |

FOREIGN PATENT DOCUMENTS

| | | | | |
|---|---|---|---|---|
| GB | 2318251 A | * | 4/1998 | H04M/3/42 |
| JP | 10037759 | | 8/1999 | |
| JP | 10133938 | | 11/1999 | |

OTHER PUBLICATIONS

Michael Stroud, MP3 Downloads: Will They "Cell"?, Wirednews.com, Oct. 5, 2000, pp. 1–2.*

* cited by examiner

*Primary Examiner*—Scott L. Weaver

(57) ABSTRACT

A voice processing system provides background audio during a telephone call between a caller and a callee telephony device. A storage system contains digital audio data and a database includes a plurality of subscriber data elements associated with the caller and callee devices. A processing device provides the digital audio data during the telephone call based on the subscriber data elements linked to the caller or callee devices such that background audio is provided during a telephone call.

34 Claims, 6 Drawing Sheets

| | 31a | 31b | 31c | 31d |
|---|---|---|---|---|
| 31 SP1 | SUBSCRIBER1 | THIRD PARTY Id1 | SERVICE CODE1 | AUDIO SELECTION CODE1 |
| SP2 | SID2 | TPId2 | SC2 | ASC2 |
| SP3 | SID3 | TPId3 | SC3 | ASC3 |
| ⋮ | ⋮ | ⋮ | ⋮ | ⋮ |
| SPN | SIDN | TPIdn | SCN | ASCN |
| | | | | |
| | | | | |
| | NNX,XXX-XXX | NNX,XXX-XXXX | | |
| | SUBSCRIBER URL | CALLER URL | | |

FIG. 2

| | 31a | 31b | 31c | 31d |
|---|---|---|---|---|
| 31 SP1 | SUBSCRIBER1 | THIRD PARTY Id1 | SERVICE CODE1 | AUDIO SELECTION CODE1 |
| SP2 | SID2 | TPId2 | SC2 | ASC2 |
| SP3 | SID3 | TPId3 | SC3 | ASC3 |
| ⋮ | ⋮ | ⋮ | ⋮ | ⋮ |
| SPN | SIDN | TPIdn | SCN | ASCN |
| | | | | |
| | | | | |
| | NNX,XXX-XXX | NNX,XXX-XXXX | | |
| | SUBSCRIBER URL | CALLER URL | | |

METHOD AND SYSTEM FOR TRANSMITTING BACKGROUND AUDIO DURING A TELEPHONE CALL

FIELD OF THE INVENTION

The present invention generally relates to enhancing a telephone call with background music, more particularly to a method and system that delivers background music or other audio during a real-time telephone call.

BACKGROUND OF THE INVENTION

As deregulation of the telephone industry continues and as companies prepare to enter the local telephone access market and long-distance market, there is a need to offer new and innovative services that distinguish common carriers from their competitors. Some services can include conference calls, directory services or integrated voice response.

Business telephone systems including a plurality of incoming lines, and/or local telephone sets, are commonly known as "key telephone" or "Private Branch Exchange (PBX)" systems. Such systems incorporate a "hold" function, which allows an incoming line to be transferred from a telephone set to a passive shunting bridge while the telephone is disconnected from the line. This bridge prevents disconnection of the incoming call during the hold interval. The calling party on the incoming line does not talk to a person, but is placed in a sort of holding period or holding queue.

During the holding period, the held party can hear no sound. He may grow bored or think he has been disconnected, and may hang up. Systems are known which are directed to solving this problem by providing the held party with music or some other form of program to occupy his time until the call is again connected to the line. This is a one-way relationship in which the music is only transmitted to the held party. Such systems are commercially known as "Music on Hold" or as "telephone hold program systems". Music-on-hold is a common feature of business systems. It is used to occupy and pacify customers in holding queues, to deliver advertising or to add professionalism to businesses large and small. One example of a telephone hold program system is described in U.S. Pat. No. 4,577,067, issued to Levy, herein incorporated by reference. A disadvantage of these "Music on Hold" systems is the lack of ability to provide the music or other audio simultaneously to the calling party and the called party during the telephone call. One method of inserting background audio in a telephone call disclosed in U.S. Pat. No. 6,125,175 to Goldberg et al. There still exists, however, a need for an improved telephony service for customers and businesses in which subscribers can selectively elect to have music or other background audio played into their live telephone conversations.

BRIEF SUMMARY OF THE INVENTION

The present invention solves the problem of offering new and innovative services that distinguish common carriers from their competitors. According to one aspect of the invention, a voice processing system provides background audio during a telephone call between a caller telephony device and a callee telephony device. The system includes a storage system containing a plurality of predetermined digital audio data files. The predetermined digital audio data files can include different types of music files. The system also includes a database having a plurality of subscriber data elements associated with the caller and callee telephony devices. In addition, the system includes a processing device for providing the predetermined digital audio data files during the telephone call based on the subscriber data elements linked to at least one of the caller or callee telephony devices. In this way, in one aspect, a telephone conversation between the users of the caller and callee telephony devices can have a virtual sound environment that can influence behavior of the users.

In another aspect of the invention, a network-based method provides background audio during a telephone call between a caller telephony device and a callee telephony device. The method includes the steps connecting a telephone call between caller telephony device and the callee telephony device. A database unit having a number of audio selections, in which an audio selection is associated with the caller and callee telephony devices. The background audio material is transmitted during the telephone call to the caller telephony device and the callee telephony device based on the audio selection.

In a third aspect of the invention, a network-based method provides background music to a calling party and a called party in which the calling party connects to a switching point. The switching point is an intermediary between the calling party and a desired called party. The method also includes determining an audio selection for playing background music associated with the calling party. Another step includes establishing a telephone call of the calling party to a desired called party. Another step includes transmitting the background music to the calling party and desired called party during the telephone call based on the audio selection associated with the calling party. Another step includes determining a subscriber data element associated with the calling party. Another step includes determining a terminating identifier data element associated with the called party. In addition, a service code data element associated with the terminating identifier data element is determined by the network.

BRIEF DESCRIPTION OF THE DRAWINGS

The foregoing summary of the invention, as well as the following detailed description of the preferred embodiments is better understood when read in conjunction with the accompanying drawings, which are included by way of example, and not by way of limitation with regard to the claimed invention:

FIG. 2 is a schematic diagram of an embodiment of a subscriber profile according to the teachings of the present invention;

DETAILED DESCRIPTION OF THE INVENTION

Figure 1:
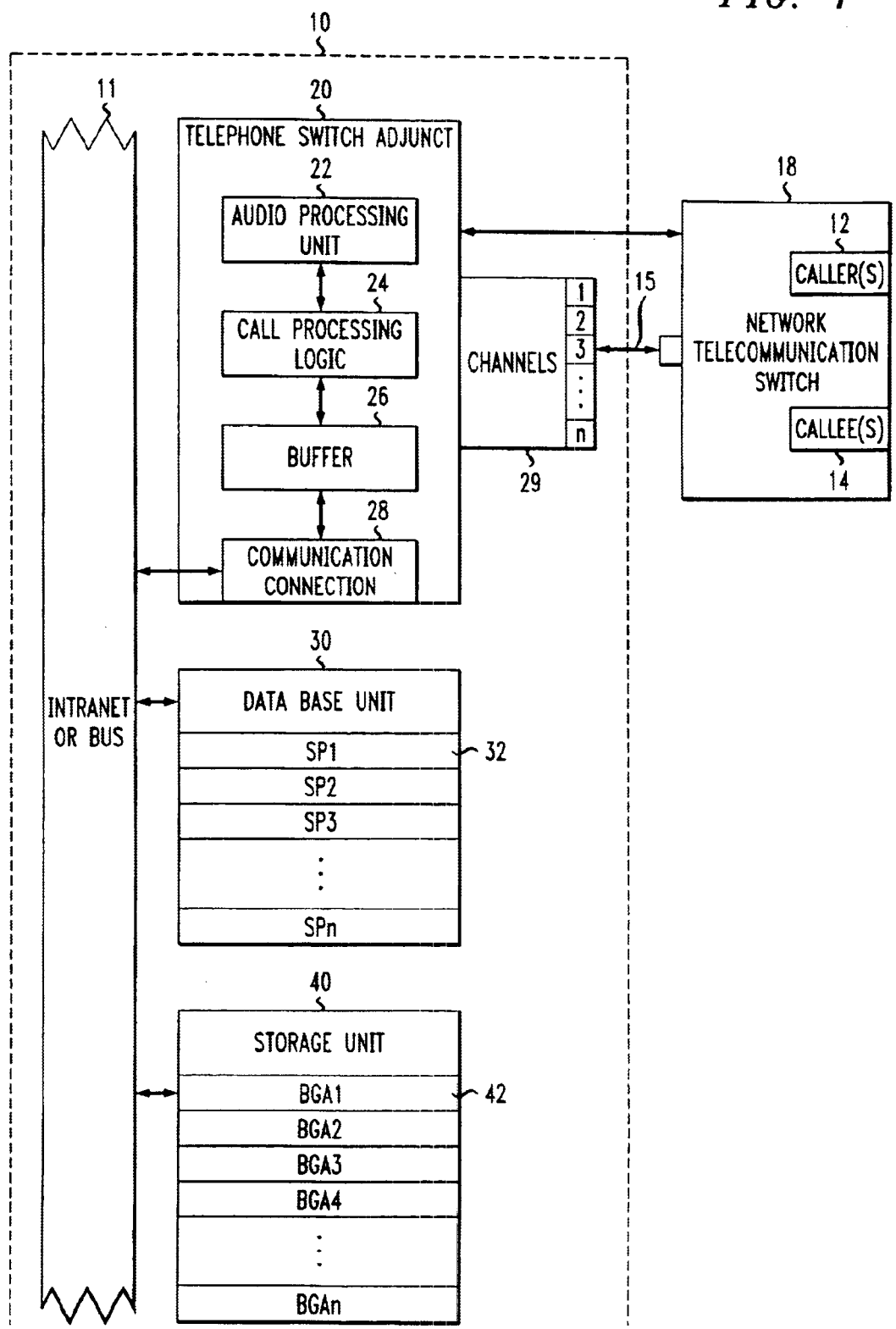
FIG. 1 is a system block diagram of an embodiment of a voice processing system according to the teachings of the present invention.

FIGS. 1–6 illustrate a system and method of "music-on-call" for transmitting background audio including music to at least two parties of a telephone call. FIG. 1 is a system block diagram of an embodiment of a voice processing system 10 for providing background audio during a telephone call between a caller telephony device 12 and a callee telephony device 14. The voice processing system includes a telephone switch adjunct (TSA) or network application processing device (NAPD) 20, a database unit (DU) 30, and a storage device or system 40. Each component will be described in detail herein. In one embodiment, TSA 20, storage device 40, and DU 30 are connected via a distributed network or bus 11.

In contrast to "music-on-hold" systems, in one embodiment of the present invention, voice processing system 10 transmits a separate predetermined digital audio signal in conjunction with telephone switch adjunct 20 to the caller telephony device and the callee telephony device in real-time during the telephone call between the parties. The predetermined digital audio signal can be music. Voice processing system 10 determines the predetermined digital audio signal to transmit by accessing and evaluating a plurality of subscriber data elements 32 in database unit 30 being linked to at least one of the caller or callee telephony devices.

Referring to FIG. 1, telephone switch adjunct 20 is connected to a telecommunications switch 18 by network transport or signaling lines 15 and 16, such as digital links or T1/T3 links. TSA 20 includes a number of subcomponents such as an audio processing unit 22, call processing logic 24, and a ring buffer 26. Each component will be described in detail herein.

Audio processing unit 22 is operatively coupled to call processing logic 24. In one embodiment, audio processing unit 22 may be supplied with existing voice computer telephony printed circuit boards with interfacing driver software. The printed circuit board hardware is configured to provide integration of the background audio during the telephone call between the caller telephony device and callee telephony device. The audio processing unit may be embodied in a PBX integration platform, such as model number D/82JCT-U™ manufactured by Dialogic® Corporation of Parsippany, N.J. The audio processing unit can handle at least 64 simultaneous channels 29 of telephone conservations and with background audio. It is recognized that more than 64 channels or less than 64 channels are within the scope of the invention. It is contemplated large scale implementation can be preformed by one of ordinary skill in the art.

With continued reference to FIG. 1, call processing logic or control circuitry 24 includes electronic hardware and software provided for execution of program steps in computer readable code. Call processing logic 24 includes software that performs arithmetic and logical functions, including programs for operational control of the various components of voice processing system 10. Call processing logic 24 is operatively coupled to various components of the system. This coupling is accomplished via wiring and functional commands with an operating system. Call processing logic 24 may include a specific purpose microprocessor, such as for processing voice input for a caller.

Buffer 26 includes a first-in-first-out (FIFO) queue for buffering of the background audio data. The buffer is used to account for network interruptions or congestion. The buffer may be sized accordingly in computer readable memory in megabytes, gigabytes, terabytes of storage for digital data to absorb interruptions without the users being aware of problems. Buffer 26 is operatively coupled to call processing logic 24 and to a distributed network or bus 11.

Referring to FIG. 1, voice processing system 10 further includes database unit 30 having a plurality of subscriber profile records 32. As shown in FIG. 2, subscriber profile records 32 include a plurality of subscriber attribute data or records 31 logically associated or mapped with the caller and callee telephony devices. Database unit 30 selectively stores subscriber attribute data 31 on a computer usable storage medium, such as a floppy drive, optical disk, magnetic hardware drive, programmable memory, or any other device that stores digitally encoded data for processing. The plurality of subscriber data elements will be explained herein. If desired, database unit 30 may be embodied in a conventional database server having operation software for retrieving and processing subscriber attribute data 31.

As shown in FIG. 2, each subscriber has account information including a unique subscriber profile 32. Data elements in each subscriber profile 32 can determine activities, such as what, when, and how background audio is played, and into what conversations the background audio is played. The values of the data elements can be established using provisioning by the subscriber enrolled in the background audio service. Subscriber profile 32 is logically mapped to or associated with subscriber attribute data 31. Subscriber attribute data 31 is embodied by several data elements—a subscriber identifier 31a, a third party identifier 31b, a service code 31c, and an audio selection code 31d. Each data element will be described in detail herein. Subscriber identifier 31a is associated with the caller or callee telephony account information such as the subscriber telephone number. Alternatively, subscriber identifier 31a can be embodied as a uniform resource location (URL) or Internet protocol address. This would be used in the case of the voice over IP (VOIP) situation. As can be seen in FIG. 2, subscriber identifier 31a is denoted an SID1 . . . SIDN, wherein N is the number of subscribers.

As shown in FIG. 2, third party identifier 31b is denoted as TPId2 . . . TPIdN. Third party identifier 31b is preferably associated with the callee in which the subscriber is designated as the caller. In that case, the value of third party identifier 31b would be the connected or terminating telephone number. Alternatively, third party identifier 31b can be also embodied by a URL, or IP address of the terminating callee telephony device. Service code 31c may include various classes of service for the subscriber, such as different billing rates or calling plans. It should be recognized that a particular subscriber may have a plurality of third party identifiers associated with that subscriber. For example, if a subscriber is the caller, they may have ten callees that the subscriber desires background audio to be provided. Accordingly, the subscriber profile record 32 would include ten separate third party identifiers for each callee telephony device/account number. The number of callees associated with a subscriber and associated third party identifiers is unlimited by the present invention. It should be recognized that the subscriber can also be the callee; in that case, the third party identifier would be linked to the caller and would be the originating number.

Subscriber profile record 32 also includes audio selection code 31d which points to a specific set of background audio to be generated or otherwise simultaneously played during the telephone call or telephony connection. The specific set of background audio includes one or more audio files in which can be any arrangement of a set of music, fragments or sound bites of music, or other types of sound recordings. The audio selection code is pointed or indexed to any of a plurality of predetermined digital audio data 42 on storage unit 40 (see FIG. 1). Voice processing system 10 is enabled to provide music for any day of the week, time of day, block of times dring a day, holiday or occasion based on the audio selection code 31*d*. For example, a retail consumer may use audio selection code 31*d* to indicate music to be played on Valentines Day, Christmas, Hanukkah, birthdays, or Independence Day. In addition, business customers may configure the audio selection code 31*d* to be associated with jingles, advertisements, music, or atmospheric sounds to provide certain audible impressions. Additionally, the audio selection code 31*d* can be linked to include a series of functional commands within the database unit, such as structural query language (SQL). It should be recognized the audio selection code 31*d* is linked to each third party identifier 31*b* for a particular subscriber such as the caller or the callee.

With reference to FIG. 1, voice processing system 10 also includes storage unit 40 that contains the plurality of predetermined digital audio data 42 embodying the background audio. This may be thought of as sound beds of audio data. Storage unit 40 selectively stores predetermined digital audio data 42 encoded in computer readable format on a computer usable storage medium, such as a floppy drive, optical disk, magnetic hardware drive, programmable memory, or any other device that stores digital data for processing. The drives and their associated computer-readable media provide non-volatile storage of computer readable instructions, data structures, program modules and other data for voice processing system 10. The computer usable medium includes computer readable code that causes a computer to execute a series of steps. The computer readable code may be stored on a server connected to a network, such as the Internet including the World Wide Web. This enables predetermined digital audio data 42 to be transmitted via network streaming or other network protocol to a destination client such as a personal computer or a telecommunications server. Predetermined digital audio data 42 can be embodied in any appropriate digital encoded files, such as waveform audio format ("WAV"), MP3, GSM, or formats used in telecommunications networks and/or the Internet and the World Wide Web. Further, while a single storage unit 40 has been described, it is contemplated that a plurality of storage units may be included or accessed by system 10.

In an alternative embodiment, the predetermined digital audio data may be embodied in firmware such as application specific integrated circuits ("ASIC"). Although the processing system described herein employs a hard disk drive, it should be appreciated by those skilled in the art that other types of computer readable media which can store data that is accessible by a voice processing system, such as magnetic cassettes, flash memory cards, random access memories ("RAMs"), read only memories ("ROMs"), and the like, may also be used in the processing system.

In alternative embodiments, while a single database unit 30 having subscriber attribute data 32 has been described, multiple databases may be included or accessed by system 10. In addition, while a single data unit 30 and storage unit 40 has been described, it is contemplated subscriber attribute data 31, and predetermined audio data 42 can be included in a sufficiently sized computer usable storage device. Further other types of subscriber data elements can be included, such as billing and payment history, most favorite music, styles of music requested, and holiday music sets, names, or addresses. In addition, subscriber profile 32 may be included or extracted from databases having billing information to subscribers on local exchange carriers, or long distance carriers. A billing database and system is described in U.S. Pat. No. 5,381,467 and is herein incorporated by reference.

Voice processing system 10 further optionally includes a controller (not shown) for storing and logging the activities of the voice processing system. The controller enables a network control center (NCC) to view the status of the voice processing system. The controller is connected and communicates with telephone switch adjust 20, database unit 30 and storage device 40. A log file can be provided to view what predetermined digital audio data 42 is being transmitted or to view past activity of what has been transmitted. The NCC can also view the number of connections and customer activity. Nevertheless, the network control center (NCC) can perform other tasks such as system management, upload and download of data files, and maintenance.

Figure 3:
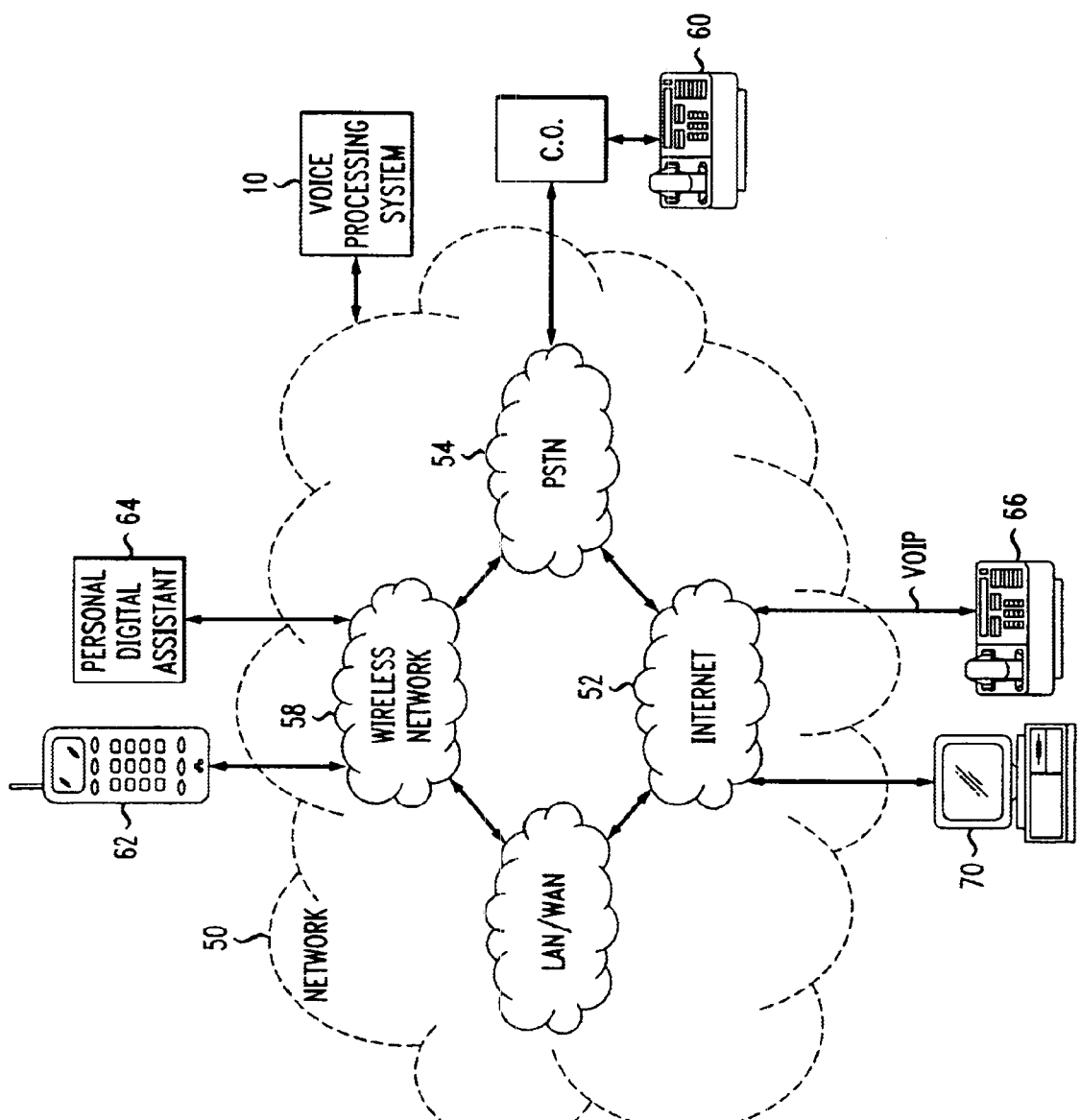
FIG. 3 is a schematic diagram of a telecommunications network environment wherein the present invention can be implemented.

FIG. 3 illustrates a telecommunications access network environment 50 where the present invention can be implemented. It is understood that the caller and callee telephony devices are linked to a telecommunication network in which account information is associated with the telephone numbers related to the devices. The telecommunications access network 50 can include a plurality of differing networks, for example, a local, national, international telecommunications network, a paging, cellular, or Personal Communication Services (PCS) network, Internet 52, cable television and/or any other suitable networks. While the embodiments described relate to communications networks including a Public Switched Telephone Network 54 (PSTN), a wireless telecommunications network 58, a broadband network, a CATV network, an SS7 network, a satellite telecommunications network, Internet, a private branch exchange system, or a wireless Centrex system, it is to be understood that the present invention can be applied to all types of communications systems and networks. It will be appreciated that the network connections shown are exemplary and other means of establishing a communications links may be used. It should be appreciated that the caller and callee telephony devices may be any device that provides telephony, such as a landline telephone 60, a wireless telephony device 62, a personal computer 70 or a laptop with a voice modem, a telephony enabled personal digital assistant 64, a handle device, a palm-sized computer (not shown), a IP enabled telephone 66 or other devices.

Figure 4:
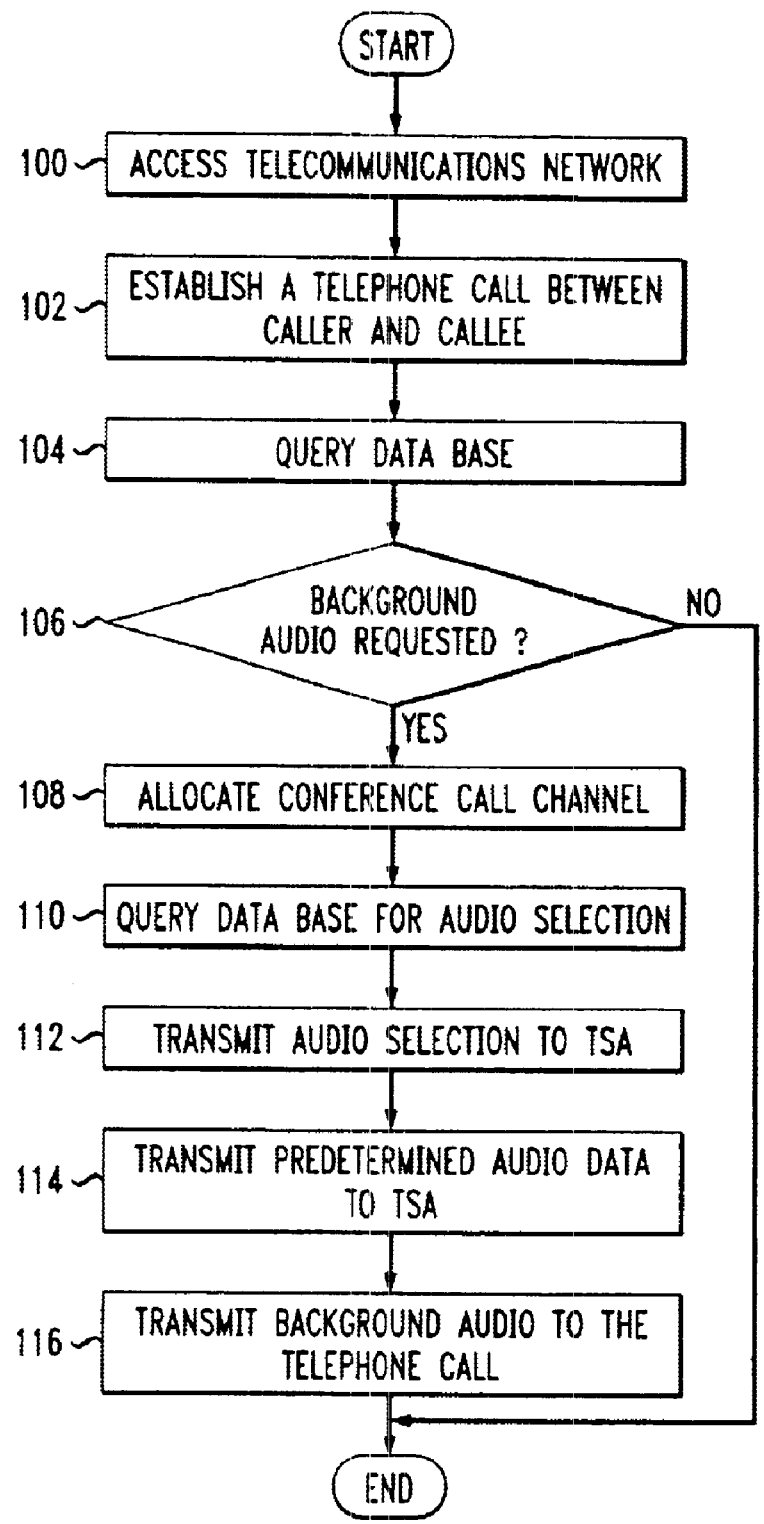
FIG. 4 is a flow diagram of an embodiment of a first method in which background audio is provided according to the teachings of the present invention.

Referring to FIG. 4, a flow diagram illustrates an embodiment of a first method of providing background audio to a telephone connection. At step 100, the caller telephony device 12 can access the telecommunications switch 18 using telecommunications access network 50 to connect to the callee telephony devices 12, 14. At step 102, a telephone call or connection is established. Telecommunications switch 18 may be a private branch exchange, or local exchange switch.

During the progress of the telephone call, telephone switch adjunct 20 receives inbound subscribed data or signals from telecommunications access network 50 or telecommunications switch 18. The connection of the telephone call may be monitored by telephone switch adjunct 20 or other devices in the network. Various protocols may be exchanged such as Signal System 7 (SS7). The subscriber data received from the network includes the caller telephone number, the callee or terminating telephone number, or other customer and network control information. This data can be retrieved by using subscriber identification similar to caller ID or automatic numbering identification (ANI) via telecommunications access network 50. This information is similar to receiving account information from the caller or callee device.

System flow proceeds to step 104 in which telephone switch adjunct 20, having temporary storage of the subscriber data, performs an operation of querying or requesting information associated with the caller and callee telephony devices from the database unit 30. At step 106, telephone switch adjunct 20 determines whether the background audio should be provided to the telephone call. In this step, database unit 30 includes the subscriber profiles 32 with the associated data elements. The account information retrieved in step 102 is compared to the contents of database unit 30. If the caller is the subscriber, then a third party identifier is compared to the callee number. Likewise if the callee is the subscriber, then a third party identifier is compared to the caller number (i.e., the originating number). If desired, an authorization code can be generated from a preselected criteria which could be embodied in attribute records in database unit 30 associated with subscriber profile 32. The authorization code can include entering a Personal Identification Number (PIN) or password prior to system 10 enabling background audio to be played. For example, the code may be entered via telephone keypad in DTMF tones. This feature is useful when a telephone number or device may have a number of different users in which, a person using the telephone device may be a subscriber for background audio. Thus, the system can request entering of the authorization code prior to proceeding.

As shown in step 108, in response to the query, if background audio was requested by the subscriber, then a conference call channel is allocated for injecting the stream of background audio into the telephone call between the caller telephony device and the callee telephony device. If desired, this can be accomplished using a conference bridge for larger scale systems. If no background audio is requested for the particular telephone call, however, then no conference call is established.

At step 110, telephone switch adjunct 20 queries the database unit for the audio selection code and/or the service code for the particular telephone call as shown in FIG. 2. For example, the query of the audio selection code 31*d* may indicate that voice processing system 10 provides music for any holiday or occasion as established by the subscriber. In addition, in the case of business customers, audio selection code 31*d* enables the voice processing system to play jingles, advertisements, music, or atmospheric sounds to provide certain audible impressions real-time during a telephone call with a customer.

Then at step 112, the database unit transmits signaling to the telephone switch adjunct 20, via control circuitry 24, including the specific audio selection code and/or service code. In response to this signaling, at step 114, the switch adjunct signals storage unit 40 to transmit a stream of background audio comprised of predetermined digital audio data 42 to buffer 26 based on the audio selection code and/or service code. When the stream is received, audio processing unit 22 processes the stream for the particular channel allocated to the conference call. Then, at step 116, system 10 transmits the background audio to the caller and callee telephony devices. This provides various benefits such as enhancing the user experience during the telephone call and providing a virtual environment composed of background music.

Figure 5:
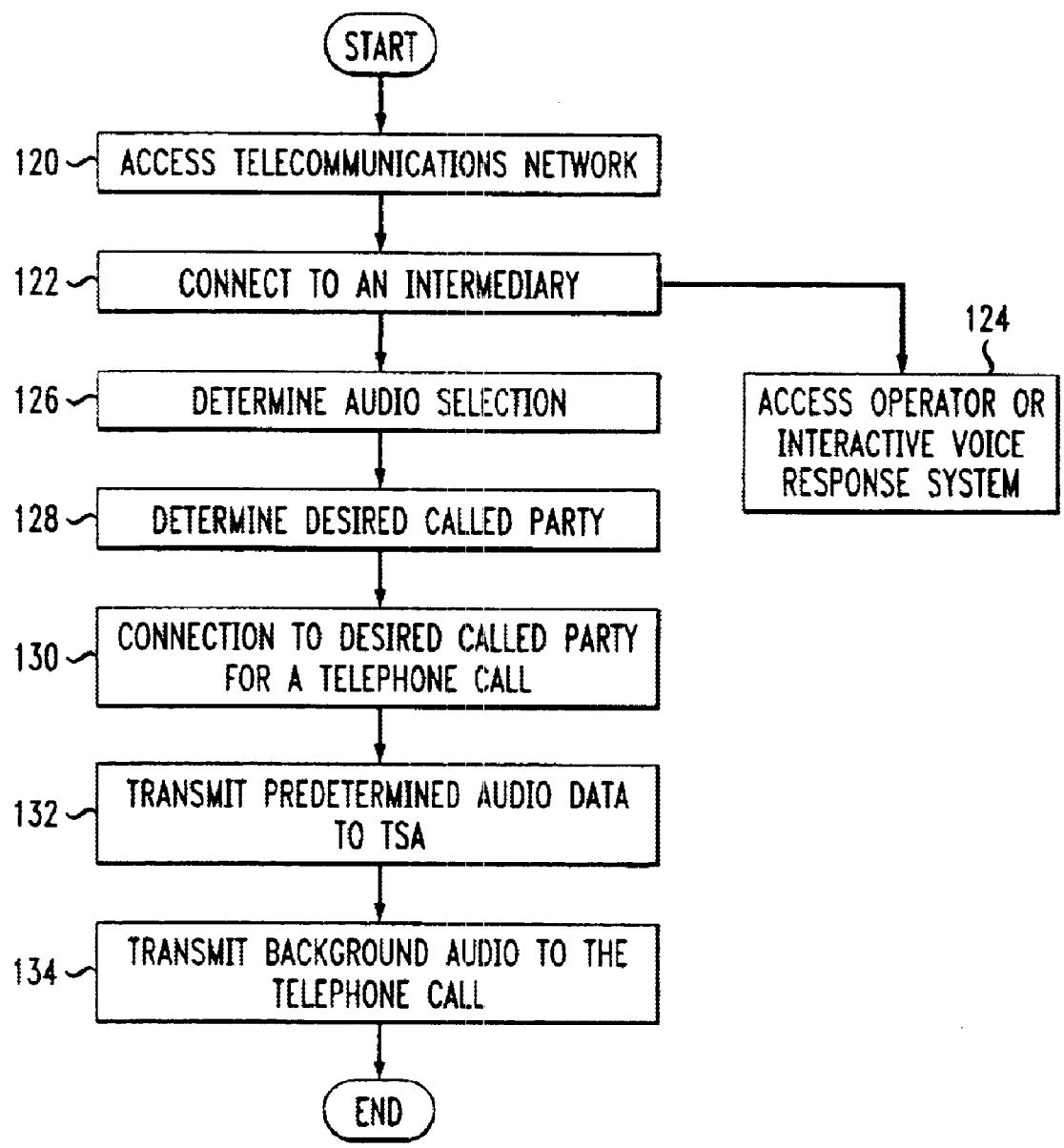
FIG. 5 is a flow diagram illustrating an embodiment of a second method in which the background audio is provided according to the teachings of the present invention.

Referring to FIG. 5, a flow diagram illustrates an embodiment of a second method of providing background audio to a telephone connection. The background audio is provided by accessing an intermediary service node or system that can is operatively connected to operator(s), a call center, a telephone central office, or similar other similar function. At step 120, the caller telephony device 14 accesses the telecommunications switch 18 using telecommunications access network 50 to connect to a switching point 124. At step 122, a connection is established between the subscriber and switching point. This switching point is an intermediate routing and servicing office for the caller. Switching point 124 may include manned operator services or remote host computers having automated interactive voice response (IVR) systems. For the IVR systems, signaling is used in which the caller can make selections by transmitting DTMF signals or voice commands. If desired, the previously described authorization code may be used. At step 126, the switching point determines an audio selection code and/or service code for playing background music associated with the calling party. The switching point establishes a final telephone call of the caller to a desired called party, as determined in step 128.

In this embodiment, the previously described database unit 30 is populated with the subscriber information for the particular caller. Alternatively, no subscriber information is contained in the database unit, but the caller is still enabled to determine the audio selection "on the fly". This is similar to a fee-for-service operator assistance use. Next at step 130, the switching point establishes a final telephone call of the caller to a desired called party. At step 132, the switch adjunct signals storage unit 40 to transmit the stream of background audio comprised of predetermined digital audio data 42 to the buffer based on the audio selection code and/or service code. Then at step 134, the background audio is transmitted to the calling party and desired called party during the telephone call based on the audio selection code associated with the subscriber.

Figure 6:
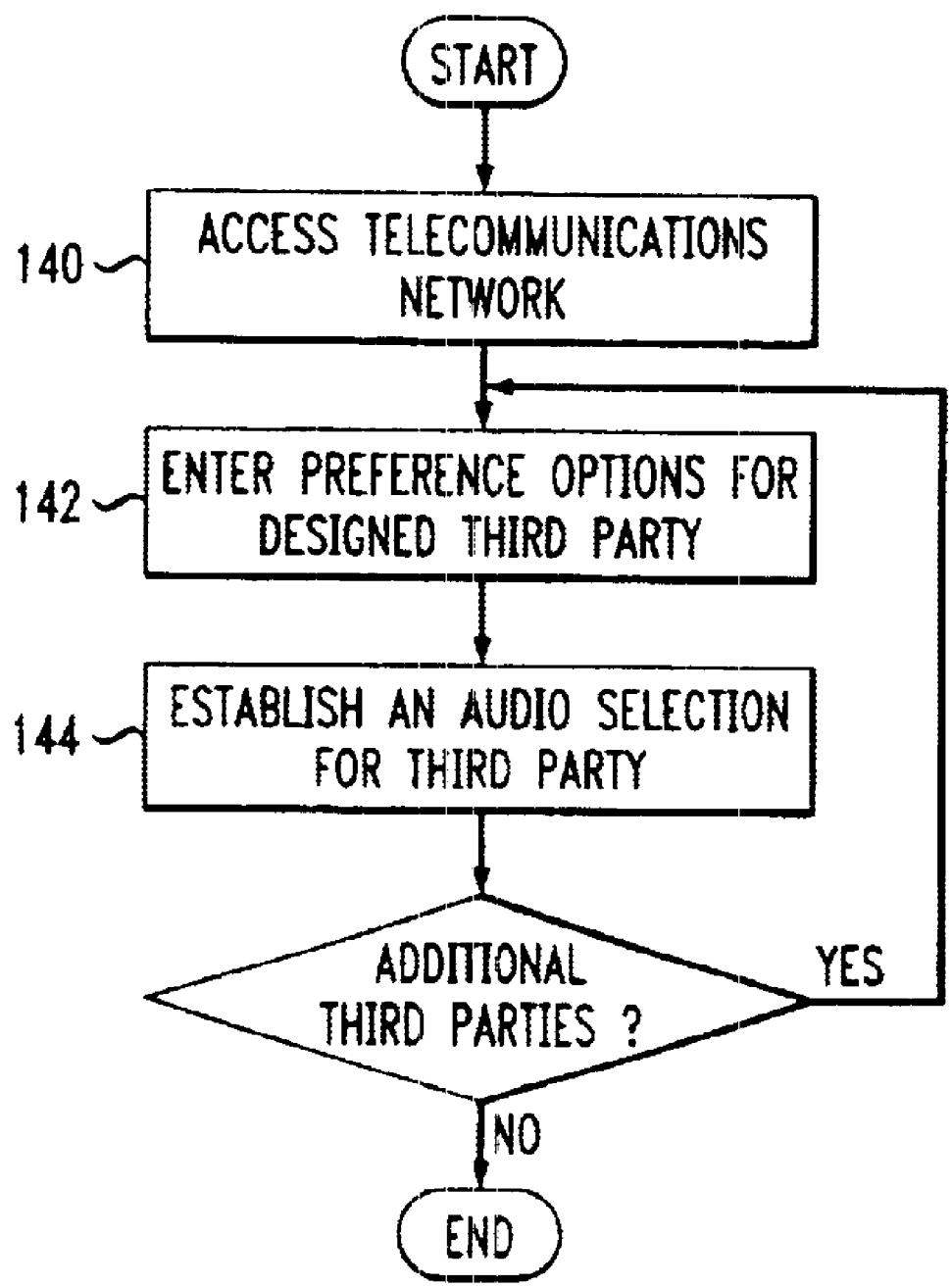
FIG. 6 is a flow diagram illustrating an embodiment of a method of provisioning background audio according to the teachings of the present invention.

Referring to FIG. 6, a flow diagram illustrates an embodiment of a method of making an audio selection or updating a portion of the subscriber profile for the voice processing system providing a stream of background audio. At step 140, a user or subscriber connects to the telecommunications access network having a destination server functionally linked to database unit 30. The destination server can be any appropriate device or process that enables the subscriber to perform self-provisioning to create the audio selection code and audio program material. The designation server may be associated with the previously described switching point 124 shown in FIG. 5.

In one embodiment, the subscriber assesses a telephone number, such as a toll-free number, associated with the destination servicing station in which the telecommunications access network may be the Public Switched Telecommunications Network. In this embodiment, the destination serving station may include interactive voice response, voice command input, or manned operator services. In an alternative embodiment, the subscriber accesses an uniform resource locator (URL) associated with the destination server wherein the telecommunications access network is connected to the Internet. Additionally, the uniform resource locator can include a web page on the World Wide Web linked to a remote server. Subscriber validation may also be determined in a number of ways to validate that a subscriber is making an authorized transactions. A validation signal can be generated from preselected criteria which could be embodied in attribute records in database unit 30 associated with subscriber profile 32. Validation can include entering a Personal Identification Number (PIN) or password prior to system 10 enabling provisioning thereof. If the account is validated, then the user may proceed. If access is not validated, a call may be transferred to a fraud control center or customer service. If remote access, such as using the Internet, was unsuccessful, then unauthorized access data can be noted or transferred for network security operations.

At step 142, the subscriber establishes the audio selection code by entering a plurality of preference options. The subscriber enters the previously desired attribute subscriber data 31 such as a specific subscriber identifier 31a, third party identifier 31b, service code 31c, and audio selection code 31d of a callee or callee telephony device. The preference options may relate to a general scheduling routine of a specific predetermined digital audio data 42 to play for a callee or caller only on a particular broad time period such as a day of the week, a particular week, a month or year. Thus, after provisioning, when a caller connects to a callee on a preselected day of the week and range time in that preselected day, the system plays the data 42 for that telephone call. In addition, under a further provisioning aspect, the subscriber may also upload digital audio data for use as background audio to the database unit. At step 144, the subscriber establishes the audio selection code by entering a plurality of preference options as provided in step 142. At step 146, the system queries the subscriber as to whether there are additional parties to which to apply provisioning and audio selection code. If additional parties are desired, then system flow returns to step 142. If no additional parties are desired, then the process ends.

In an alternative embodiment, the subscriber is enabled to start the background audio by entering commands during the telephone call. The subscriber, in real-time, inputs commands for starting, stopping, modifying, and selecting various audio selection codes for the transmission of the stream of background audio. The commands can be transmitted using Dual Tone Multi-frequency (DTMF) from the caller telephony device. The following is one example of operation: the caller presses a code, say *100, and system 10 receives such code (*100). Then system 10 obtains the account number or information of the calling party by ANI or other methods. Then system 10 can automatically retrieve subscriber information for the caller. The system plays the particular audio selection based any one, the callee terminating number, or the caller originating number.

It is also contemplated that voice processing system 10 may transmit or otherwise provide predetermined selections or packages of background audio. These predetermined selections would be based on a variation of the audio selection code. The predetermined selections can be enabled as a "jazz music" suite, "easy listening" suite, "hip-hop" or "rhythm and blues" suite, classical music suite, and other arrangements. It is also contemplated that the invention could include a repository of audio sound recordings. The repository may include prerecorded music encoded in the digital audio format. A repository service provider connected to telecommunications access network 50 is enabled to transmit or download the prerecorded music to the previously described database unit 40 in voice processing system 10.

In another embodiment, TSA 20 may be implemented with a general purpose computing device in the form of a host computer system configured to operate with telephony devices, including telecommunication switches. The host computer may include a central processing unit, a system memory, and a system bus that couples various system components including the system memory to the central processing unit. The computer may have an exemplary operating system such as MICROSOFT WINDOWS®, WINDOWS NT®, UNIX®, or LINUX®. The system memory includes read only memory ("ROM") and random access memory ("RAM").

All U.S. patents referred above are fully incorporated by reference for all purposes. While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation or material to the teachings of the invention without departing from the scope thereof. For example, in yet other embodiments, video telephone systems are also contemplated such as systems operating over broadband CATV networks, including coaxial or fiber optics networks. Therefore, it is intended that the invention not be limited to the particular embodiment disclosed, but that the invention will include all embodiments falling within the scope of the appended claims.

What is claimed is:

1. A system for providing a background audio signal during a telephone connection between a caller and a callee, the system comprising
   a storage device containing a plurality of predetermined audio data files;
   a billing information database having at least one network subscriber data element associated with the caller or callee;
   a background audio subscriber attribute database having at least one background audio subscriber data element associated with the caller or callee, at least a portion of the background audio subscriber data element being extracted from the billing information database; and
   a processing device for providing the predetermined audio data files in a background audio signal into the telephone connection responsive to the at least one background audio subscriber data element.

2. The system of claim 1, wherein the predetermined ausdio data files are embodied in a computer readable code.

3. The system of claim 2, wherein the predetermined audio data files are music files.

4. The system of claim 1, further comprising a network for communicating between the storage device, the database, and the processing device.

5. The system of claim 1, wherein the network is a telecommunications network.

6. The system of claim 5, wherein the telecommunications network is a public switched telephone network.

7. The system of claim 5, wherein the telecommunications network is the Internet.

8. The system of claim 5, wherein the telecommunications network is wireless.

9. A method of providing a background audio signal during a telephone call between a caller telephony device and a callee telephony device, the method comprising the steps of:
   accessing a database containing telecommunications subscriber billing information and background audio subscriber profile information associated with an account of the caller telephony device or callee telephony device;
   connecting a telephone call between the caller telephony device and the callee telephony device;
   accessing an audio selection associated with the profile information of the caller telephony device or callee telephony device; and transmitting the background audio signal during the telephone call to at least one of the caller telephony device and the callee telephony device based on the audio selection.

10. The method of claim 9, further comprising the step of transmitting the background audio signal in the form of music.

11. The method of claim 9, wherein audio selection includes at least a day of the week.

12. The method of claim 9, wherein the audio signal is logically mapped to the caller telephony device.

13. The method of claim 12, wherein the audio signal is logically mapped to the callee telephony device.

14. The method of claim 9, further comprising the step of determining a subscriber data element associated with the caller telephony device.

15. The method of claim 14, further comprising the step of determining a terminating identifier data element associated with the callee telephony device.

16. The method of claim 15, further comprising the step of determining a service code data element associated with the terminating data.

17. A method of providing a background music to a called party during a telephony connection, comprising the steps of:
   connecting the calling party to an intermediary service node having an interactive voice response system;
   determining an audio selection code for playing background music associated with the calling party, by accessing a telecommunications subscriber billing database;
   establishing a telephone connection between the calling party to a desired called party; and
   transmitting the background music to the calling party and called party during the telephone connection based on the audio selection associated with the calling party.

18. The method of claim 17, further comprising the step of accessing the background music from a database.

19. The method of claim 18, wherein the audio selection code is logically mapped to the calling party.

20. The method of claim 18, wherein the audio selection code is logically mapped to the called part including transmitting the background music based on a day of the week.

21. The method of claim 18, further comprising the step of determining a subscriber data element associated with the calling party.

22. The method of claim 21, further comprising the step of determining a terminating identifier data element associated with the called party.

23. The method of claim 22, further comprising the step of determining a service code data element associated with the terminating identifier data element.

24. A method of providing an audio selection for a system transmitting background audio during a telephone call between a calling part and a called party, the method comprising the steps of:
   receiving a signal for accessing a destination server in a telecommunications network;
   obtaining a calling party identification; and
   establishing an audio selection by retrieving at least one preference option from a telecommunications network subscriber billing database.

25. The method of claim 24, wherein the step of receiving a signal further comprises connecting to a uniform resource locator associated with the destination server.

26. The method of claim 25, wherein the uniform resource locator includes a web page on the World Wide Web.

27. The method of claim 24, wherein the step of receiving a signal further comprises connecting to a telephone number associated with the destination server.

28. The method of claim 27, wherein the destination servier includes interactive voice response.

29. The method of claim 28, wherein the destination server includes an operator.

30. The method of claim 24, further comprising the step of generating a subscriber profile record for the database.

31. The method of claim 30, wherein the subscriber profile record further comprises a subscriber identifier record.

32. The method of claim 31, wherein the subscriber profile record further comprises a third part record identifier.

33. The method of claim 32, wherein the subscriber profile record further comprises a service code record.

34. The method of claim 33, wherein the subscriber profile record further comprises an audio selection record.

* * * * *